3,118,863
ACCELERATORS
Robert B. Knill, Akron, and Charles N. Meier, Stow, Ohio, assignors to The Goodyear Tire & Rubber Company, Akron, Ohio, a corporation of Ohio
No Drawing. Filed June 2, 1959, Ser. No. 817,449
16 Claims. (Cl. 260—79.5)

This invention relates to improvements in the compounding of rubbers whereby rubber products are obtained with unusual resistance to deterioration by heat and oxidation and is particularly concerned with the preparation and use of a new curing system for rubbers comprised of particular amino azole disulfides combined with critical amounts of sulfur.

It is well known to those skilled in the art of rubber compounding that the use of certain organic accelerators such as thiuram sulfides and dithiocarbamates in combination with low concentrations of elemental sulfur or in the total absence of elemental sulfur will produce rubber products of unusual resistance to heat and oxidation.

It is also well known that curing systems of this nature are not in general use in the rubber industry because of their tendency to induce processing difficulties in rubber compounds in which they are used. These difficulties generally stem from what is known as incipient vulcanization, premature cure or "scorch."

These tendencies have prevented the use of these types of curing systems to any large degree even though the benfits that could be obtained with these systems are obvious.

It is also well known in the rubber industry that present day rubber compounds must have substantial resistance to "scorch" in order to be safety processed in modern rubber equipment. This processing would consist of mixing, calendering, extruding, frictioning and other methods through which a rubber compound must proceed prior to being built and cured into a finished article.

Present and past tendencies in the rubber industry have been toward the use of materials and especially accelerators which will absorb the heat and energy generated during processing, without incipient vulcanization or premature cure. These tendencies are conceded to be the major reason that sulfenamide or "delayed action" accelerators have become so prominent as rubber accelerators. These sulfenamides, as a class, possess excellent resistance to "scorching." However, they do not provide excellent resistance to aging and deterioration in rubber compounds since it is necessary to use high levels of sulfur in order to obtain satisfactory cures.

Rubber compound processing has become more and more of a problem because of (1) the use of higher loadings of carbon blacks and harder processing carbon blacks, (2) faster and shorter mixing times, and (3) faster extruding and calendering.

In the practice of this invention, the advantages of low sulfur curing systems can be obtained without the disadvantages of premature cure by the use of accelerators of the secondary amino azole disulfide glass having the general structure.

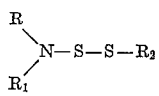

in which R and $R_1$ are the same or different aliphatic groups, cycloaliphatic groups or aralkyl groups or R and $R_1$ together form a single chain or ring and $R_2$ represents a member of the class consisting of thiazoles, oxazoles and imidazoles. R and $R_1$ may be alkyl radicals having from 1 to 10 carbon atoms, cycloalkyl radicals having from 3 to 10 carbon atoms, aryl radicals having from 6 to 12 carbon atoms, aralkyl radicals having from 7 to 12 carbon atoms, or R and $R_1$ may form a closed chain or ring which can be interrupted by sulfur, oxygen, or nitrogen.

The thiazoles, oxazoles, and imidazoles identified as $R_2$ may be unsubstituted ring structures or the carbon atoms of the single ring structure may be substituted with any of the radicals identified above as R or $R_1$. Also, the thiazoles, oxazoles, and imidazoles may have aryl rings such as benzene and naphthalene rings as part of their ring structure. The benzene and naphthalene rings may be further substituted with any of the radicals identified above as R and $R_1$.

More specifically, this invention relates to the use of secondary amino azole disulfides having two sulfur atoms between the amino nitrogen and the azole group. A preferred member of this class would be 4-morpholinyl-2-benzothiazyl disulfide which has the following structure:

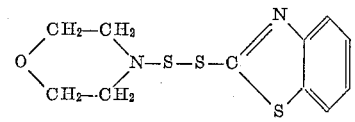

These materials possess not only the excellent "delayed action" for which sulfenamides are so well known, but, having a disulfide present in the structure, also possess the curing potency of materials such as the thiuram disulfides and dithiocarbamates, often referred to as ultra accelerators.

Through the use of critical concentrations of these accelerators with critical concentrations of elemental sulfur, rubber compounds can be obtained with excellent heat and oxidation resistance but with a constant high scorch resistance and fast rate of cure. The concentration of elemental sulfur can range from 1.5 to 0.5% by weight and the concentration of secondary amino azole disulfide accelerator can range from 0.75 to 4.0% by weight, based on the weight of rubber. The total amount of sulfur contained in the curing system, e.g., free sulfur plus sulfur in the secondary amine azole disulfide, does not necessarily determine the optimum curing systems. Obviously, the upper and lower extremes of combined free sulfur and secondary amine azole disulfide, e.g., 0.5% by weight of sulfur plus 0.75% by weight of secondary amine azole disulfide and 1.5% by weight of free sulfur and 4.0% by weight of secondary amine azole disulfide, would not generally provide optimum cures although such amounts might be useful for particular products. In general, however, there is an optimum secondary amine azole disulfide concentration for every concentration of free sulfur within the critical range. The total amount of free sulfur and secondary amine azole disulfide will generally range from about 4.5% by weight, based on the weight of rubber, to about 1.5% by weight, based on the weight of rubber. The best curing systems appear to range from about 2.5% by weight of total free sulfur and secondary amine azole disulfide to about 2.0% by weight of total free sulfur plus secondary amine azole disulfide, based on the weight of rubber.

The rubbers which can be cured by the curing systems of this invention are oxidizable, sulfur-curable rubbery polymers of conjugated dienes which include natural rubber and the various synthetic diene rubbers which are similar to natural rubber in their curing characteristics, such as butyl rubber, which is a polymerization product of a major proportion of a mono olefin, such as isobutylene, and a minor proportion of a multi-olefin, such as butadiene or isoprene; the rubbery copolymers of butadiene and styrene which may contain from 50 to 75% by weight of butadiene; the rubbery copolymers of butadiene and acrylonitrile, polybutadiene and polyisoprene.

Obviously, the curing systems of this invention may be used in curing rubbers compounded with any of the customarily used rubber compounding ingredients in proportions well known in the art. For example, the rubber composition may contain any of the well known fillers such as carbon blacks, metallic oxides, etc.; softeners such as the various oils, asphalts and tars, etc.; lubricants such as fatty acids, soaps, viscous oils, etc.; and antioxidants such as one or more of the known amine antioxidants or one or more of the phenolic antioxidants, etc.; and any of the other customary compounding ingredients used in the art.

Also, the curing systems of this invention may be used in connection with the curing of any of the known sulfur-curable rubbers using the known curing conditions of time, temperature and pressure. For example, rubber compositions containing the curing systems of this invention may be cured during the customary cycles which may range from 12 minutes to 10 hours, from 200° F. to 330° F. and from 25 to 400 pounds per square inch pressure. Obviously, thin rubber sheets would require lower times, temperatures and pressures than would the curing of giant earth mover tires.

The efficacy of the curing systems of this invention is illustrated by the following tests, wherein the indicated curing systems were added to the following standard rubber formulation:

| | |
|---|---:|
| Smoked sheets | 100.00 |
| H.A.F. black | 50.00 |
| Asphaltic softener | 3.00 |
| Stearic acid | 3.00 |
| Zinc oxide | 3.00 |
| Phenyl-beta-naphthylamine | .35 |
| Phenyl-alpha-naphthylamine | 1.00 |
| Mixtures (65% phenyl-beta-naphthylamine, 35% diphenyl-para-phenylenediamine | .75 |
| | 161.10 |

To the above standard rubber formulation, the sulfur-accelerator systems of this invention were added wherein the sulfur content varied from 0.5 to 1.5% by weight and the accelerator varied from 0.75% to 4.0% by weight, both based on the weight of rubber.

Mooney scorch tests were performed as described in ASTM D927–55T using the small (1 3/16″) rotor. The samples were allowed to pre-heat for one minute before starting the motor. The dial reading was taken at 1½ minutes and the test was continued until the dial showed a 20 point rise above the initial reading. The time required to produce this change was recorded as the scorching time.

The higher the time required to produce this 20-point rise in a given stock, the more resistant is the stock to scorch or premature cure. This method is used as a standard measure for determining the ability of a given stock to absorb the heat and work generated during factory processing without scorching.

The following table gives Mooney scorch data for various curing systems of this invention when compounded in the base rubber formulation, described above, and compares the curing systems of this invention with a commercial accelerator.

*Table I*

| Stock | A | B | C | D | E | F |
|---|---|---|---|---|---|---|
| Sulfur | 1.50 | 1.00 | .50 | 2.50 | 1.00 | 0.00 |
| MBD [1] | .75 | 1.00 | 2.00 | | | |
| TUADS [2] | | | | .50 | 1.00 | 4.00 |
| Mooney Scorch at 250° F.: Time in Minutes to 20-point rise | 54¾ | 55 | 49 | 6½ | 9 | 9 |

[1] 2-(4-morpholinyldithio)benzothiazole.
[2] Tetra methyl thiuram disulfide.

These data clearly illustrate the superiority of the curing systems of this invention over curing systems presently used commercially by showing that rubber stocks compounded with the curing systems of this invention have much less tendency to scorch than a current commercial curing system. For example, although each of samples B and E contain 1% by weight of sulfur and 1% by weight of accelerator in the same standard rubber stock, the scorch resistance of the curing system of this invention was over 6 times better than the scorch resistance of the commercial curing system.

In the following table, the curing systems were mixed with the standard rubber stock, described above, and cured in the form of sheets after which dumbell samples were cut therefrom as outlined in A.S.T.M. D15–55T and D412–51T, the cure being at the customary 275° F. for 70 minutes, except where indicated otherwise.

*Table II*

| Stock | A | B | C | D | E | F |
|---|---|---|---|---|---|---|
| Sulfur | 1.50 | 1.00 | .50 | 2.50 | 1.00 | |
| MBD [1] | .75 | 1.00 | 2.00 | | | |
| TUADS [2] | | | | .50 | 1.00 | 4.00 |
| 300% Modulus | 2,350 | 2,300 | 2,350 | 3,225 | 2,950 | 2,325 |
| Ult. Tensile | 4,250 | 4,275 | 4,250 | 4,075 | 3,800 | 3,450 |
| Elongation at Break | 520 | 525 | 510 | 380 | 380 | 420 |

[1] 2-(4-morpholinyldithio) benzothiazole.
[2] Tetra methyl thiuram disulfide.

These data show that the curing systems of this invention are as potent as commercial Tuads (tetra methyl thiuram disulfide) in ultimate curing action. Note that for the Tuads stock there is a tendency for moduli and tensile strengths to fall off as the sulfur level is reduced whereas with the MBD accelerated stocks of this invention tensile strengths are higher and the moduli and tensile strengths are essentially constant regardless of which sulfur-accelerator ratio is used. This is evidence also that for any given sulfur level from 1.50% to 0.5% there is a definite level of MBD which will produce optimum cured physical properties.

In the the following table, the samples were prepared as described in connection with the data in Table II and thereafter aged in an air bomb with the pressure at 80 pounds per square inch at a temperature of 236° F. for the times shown in the table (ASTM test D454–53).

*Table III*

| Stock | A | B | C | E | F |
|---|---|---|---|---|---|
| Original Tensile Strength from Table II | 4,250 | 4,275 | 4,250 | 3,800 | 3,450 |
| Tensiles after 7 hours Air Bomb | 3,250 | 3,400 | 3,550 | 3,100 | 3,300 |
| Tensiles after 14 hours Air Bomb | 2,200 | 2,735 | 3,235 | 2,900 | 3,035 |

Although this test is quite severe, these data illustrate that the curing systems of this invention are equivalent to or better than the best curing system known in the art but, as pointed out above, without the undesirable characteristic of scorching.

Hot strip adhesion tests were performed according to ASTM Standard Test procedure D413–39. The indicated curing systems of this invention were compounded into the rubber formulation shown above and compared with a universally used commercial curing system, as indicated in the following Table IV. These samples were adhered to a standard crude rubber cushion stock. These adhesion tests were run on a vertical Scott adhesion tester at a temperature of 200° F. The stocks are shown in Table I.

*Table IV*

[Hot strip adhesion tests]

| Stock | A | B | C | D | E | F |
|---|---|---|---|---|---|---|
| Pounds | 68 | 75 | 46 | 18 | 19 | 7 |

These data clearly show that the curing systems of this invention, illustrated by samples A, B and C, display much improved curing compatability when compared with a standard commercial ultra accelerator, tetra methyl thiuram disulfide (Tuads), illustrated by samples D, E and F.

Crescent tear tests were performed according to ASTM test procedure D624–54 using a razor nicked crescent specimen with tab ends. The test samples were prepared as in the above tests by mixing the curing systems into the rubber formations. The samples are numbered as in Table I.

*Table V*

[Crescent tear in pounds]

| Stock | A | B | C | D | E | F |
|---|---|---|---|---|---|---|
| Room Temp | 560 | 612 | 585 | 527 | 530 | 479 |
| 250° F | 384 | 376 | 350 | 330 | 277 | 269 |

These data show that the curing systems of this invention (stocks A, B and C) provide cured rubber stocks superior in tear resistance to stocks cured with a commercial accelerator, tetra methyl thiuram disulfide (Tuads).

Although tetra methyl thiuram disulfide (Tuads) is generally used in the rubber industry as a standard of comparison for curing systems and accelerators, tests were completed which show that the curing systems of this invention are superior to other widely used accelerators. In the following table, data are presented which compare the curing systems of this invention with N-oxydiethylene benzothiazyl-2-sulfenamide (NOBS #1). The stocks were prepared by mixing the indicated curing systems in the above standard rubber formulation.

*Table VI*

| Stock | G | H | I | J | K | L | M | N |
|---|---|---|---|---|---|---|---|---|
| Sulfur | 1.00 | 1.00 | .50 | .50 | .25 | .25 | | |
| NOBS #1 [1] | 1.00 | | 2.00 | | 3.00 | | 4.00 | |
| MBD | | 1.00 | | 2.00 | | 3.00 | | 4.00 |
| 300% Modulus, Minutes Cure: | | | | | | | | |
| 35 | 1,680 | 1,750 | 1,330 | 1,780 | 790 | 1,700 | | 920 |
| 70 | 1,690 | 1,810 | 1,500 | 1,980 | 1,270 | 1,970 | | 1,900 |
| 140 | 1,660 | 1,850 | 1,640 | 2,030 | 1,330 | 2,050 | | 2,050 |
| 210 | 1,760 | 1,820 | 1,610 | 2,000 | 1,380 | 2,000 | | 2,120 |
| Ult. Tens.: | | | | | | | | |
| 35 | 3,970 | 4,160 | 3,800 | 4,280 | 2,220 | 3,400 | No Cure Evident | 2,700 |
| 70 | 4,030 | 4,080 | 4,160 | 4,150 | 3,560 | 4,200 | | 4,000 |
| 140 | 3,900 | 4,100 | 4,150 | 4,150 | 3,560 | 3,880 | | 4,160 |
| 210 | 3,790 | 4,050 | 3,950 | 4,050 | 3,530 | 3,800 | | 4,000 |
| Elong.: | | | | | | | | |
| 35 | 580 | 560 | 605 | 565 | 525 | 480 | | 560 |
| 70 | 555 | 545 | 615 | 515 | 590 | 520 | | 560 |
| 140 | 530 | 530 | 585 | 505 | 585 | 470 | | 500 |
| 210 | 520 | 530 | 560 | 505 | 555 | 465 | | 480 |

[1] N-oxydiethylene benzothiazyl-2-sulfenamide.

From all these data, it is obvious that not only do the curing systems of this invention possess the excellent aging characteristics of similar Tuads accelerated stocks, but also eliminates the old disadvantages long associated with the use of Tuads and other ultra accelerators in low sulfur systems. Thus, the curing systems of this invention provide superior "scorch" resistance, crescent tear, and adhesion, etc., in comparison with materials such as Tuads, while being equivalent or better in resistance to heat and oxidation.

For optimum curing conditions, as disclosed above, at every concentration of free sulfur within the critical range there is a corresponding optimum concentration of secondary amine azole disulfide. Although these concentrations will vary somewhat with the time and temperature of cure as well as the nature of the product being cured, the following tables illustrate optimum concentrations of free sulfur and secondary amine azole disulfides for the indicated curing conditions. These samples were prepared from the rubber formulation shown herein and the tests were the same as described in Table II except that the tests were run at 250° F.

*Table VII*

[Cured 70 minutes at 275° F. Tensile strengths at 250° F.]

| Stock | O | P | Q | R |
|---|---|---|---|---|
| Percent Sulfur | .50 | .50 | .50 | .50 |
| Percent MBD [1] | .75 | 1.00 | 2.00 | 4.00 |
| Ult. Tensile | 1,730 | 2,090 | 2,580 | 1,875 |
| Elongation at Break | 770 | 715 | 640 | 340 |

[1] 4-morpholinyl-2-benzothiazyl disulfide.

*Table VIII*

[Cured 70 minutes at 275° F. Tensile strengths at 250° F.]

| Stock | S | T | U | V |
|---|---|---|---|---|
| Percent Sulfur | 1.00 | 1.00 | 1.00 | 1.00 |
| Percent MBD [1] | .75 | 1.00 | 2.00 | 4.00 |
| Ult. Tensile | 2,245 | 2,565 | 2,260 | 1,695 |
| Elongation at Break | 660 | 635 | 510 | 365 |

[1] 4-morpholinyl-2-benzothiazyl disulfide.

*Table IX*

[Cured 70 minutes at 275° F. Tensile strengths at 250° F.]

| Stock | W | X | Y | Z |
|---|---|---|---|---|
| Percent Sulfur | 1.50 | 1.50 | 1.50 | 1.50 |
| Percent MBD [1] | .75 | 1.00 | 2.00 | 4.00 |
| Ult. Tensile | 2,440 | 2,040 | 1,945 | 1,090 |
| Elongation at Break | 590 | 500 | 400 | 185 |

[1] 4-morpholinyl-2-benzothiazyl disulfide.

From the above tables it is clear that for every concentration of free sulfur within the critical range there is a corresponding optimum concentration of secondary amine azole disulfide, and that the optimum total concentration of free sulfur plus secondary amine azole disulfide will generally range from about 1.5% by weight to 4.5% by weight, based on the weight of rubber.

Tests similar to the above have been made except that butadiene-styrene rubber (SBR), containing about 77% butadiene and 23% styrene, and butyl rubber containing about 95% isobutylene and 5% isoprene were substituted for natural rubber in the base stock. Similar excellent results were obtained which supplement and verify the data recited in Tables I through IX. Thus, the curing systems of this invention are applicable to any sulfur-curable rubber composition.

The curing systems of this invention may be added to rubbers in latex form or in the form of coagulated rubbers. For example, the curing systems of this invention may be added to rubber in the form of master batches or they may be added to coagulated rubbers in an internal mixer or on an open mill. The rubbers may, and often will, contain various other rubber compounding ingredients. The curing systems of this invention may be added to the rubber compounds as a mixture of sulfur and disulfide or the two components may be added to the rubber separately. The latter is the preferred method of adding the curing systems to rubbers.

The products of this invention may be used to cure rubber stocks which are useful in any of the various rubber products such as tires, mats, etc.

This application is a continuation-in-part of Serial Number 731,153, filed on April 28, 1958, now abandoned.

While certain representative embodiments and details have been shown for the purpose of illustrating the invention, it will be apparent to those skilled in the art that various changes and modifications may be made therein without departing from the spirit or scope of the invention.

We claim:

1. A sulfur-curable diene rubber composition containing as a non-scorch curing system capable of rapidly vulcanizing said rubber, from 0.5% to 1.5% by weight of sulfur, based on the weight of said rubber, and from 0.75% to 4.0% by weight of a secondary amino azole disulfide conforming to the following general structure:

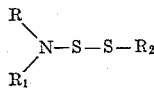

in which R and $R_1$ are selected from the group consisting of aliphatic radicals, cycloaliphatic radicals, aralkyl radicals, and rings formed by joining together R and $R_1$ and wherein $R_2$ is selected from the class consisting of thiazoles, oxazoles, and imidazoles, based on the weight of said rubber.

2. The composition of claim 1 wherein the secondary amino azole disulfide is 2-(di-n-butylamino-dithio) benzothiazole.

3. The composition of claim 1 wherein the secondary amino azole disulfide is 2-(piperidyldithio) benzothiazole.

4. A method of curing a sulfur-curable diene rubber composition comprising heating said rubber in the presence of a non-scorch curing system capable of rapidly vulcanizing said rubber composition comprised of from 0.5% to 1.5% by weight of sulfur, based on the weight of said rubber, and from 0.75% to 4.0% by weight of a secondary amino azole disulfide conforming to the following general structure

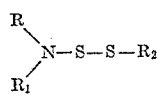

in which R and $R_1$ are selected from the group consisting of aliphatic radicals, cycloaliphatic radicals, aralkyl radicals, and rings formed by joining together R and $R_1$ wherein $R_2$ is selected from the class consisting of thiazoles, oxazoles, and imidazoles, based on the weight of said rubber.

5. A method according to claim 4 wherein the secondary amino azole disulfide is 2-(di-n-butylaminodithio) benzothiazole.

6. A method according to claim 4 wherein the secondary amino azole disulfide is 2-(piperidyldithio) benzothiazole.

7. A sulfur-curable diene rubber composition containing as a non-scorch curing system capable of rapidly vulcanizing said rubber, from 0.5% to 1.5% by weight of sulfur, based on the weight of said rubber, and from 0.75% to 4.0% by weight of a secondary amino azole disulfide conforming to the following general structure:

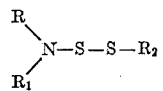

in which R and $R_1$ are selected from the group consisting of aliphatic radicals, cycloaliphatic radicals, aralkyl radicals, and rings formed by joining together R and $R_1$ and wherein $R_2$ is selected from the class consisting of thiazoles, oxazoles, and imidazoles, based on the weight of said rubber, the total amount of free sulfur and secondary amine azole disulfide ranging from about 1.5% by weight to 4.5% by weight, based on the weight of the rubber.

8. The composition of claim 7 wherein the secondary amino azole disulfide is 2-(di-n-butylaminodithio) benzothiazole.

9. The composition of claim 7 wherein the secondary amino azole disulfide is 2-(piperidyldithio) benzothiazole.

10. A method of curing a sulfur-curable diene rubber composition comprising heating said rubber in the presence of a non-scorch curing system capable of rapidly vulcanizing said rubber composition comprised of from 0.5% to 1.5% by weight of sulfur, based on the weight of said rubber, and from 0.75% to 4.0% by weight of a secondary amino azole disulfide conforming to the following general structure

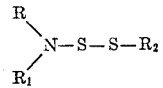

in which R and $R_1$ are selected from the group consisting of aliphatic radicals, cycloaliphatic radicals, aralkyl radicals, and rings formed by joining together R and $R_1$ wherein $R_2$ is selected from the class consisting of thiazoles, oxazoles, and imidazoles, based on the weight of said rubber, the total amount of free sulfur and secondary amine azole disulfide ranging from about 1.5% by weight to 4.5% by weight, based on the weight of the rubber.

11. A method according to claim 10 wherein the secondary amino azole disulfide is 2-(di-n-butylaminodithio) benzothiazole.

12. A method according to claim 10 wherein the secondary amino azole disulfide is 2-(piperidyldithio) benzothiazole.

13. A sulfur-curable diene rubber composition containing as a non-scorch curing system capable of rapidly vulcanizing said rubber from 0.5% to 1.5% by weight of sulfur, based on the weight of said rubber, and from 0.75% to 4.0% by weight of 2-(4-morpholinyl dithio)-benzothiazole, based on the weight of said rubber.

14. A method of curing a sulfur-curable diene rubber composition comprising heating said rubber in the presence of a non-scorch curing system capable of rapidly vulcanizing said rubber composition, comprised of from 0.5% to 1.5% by weight of sulfur, based on the weight of said rubber, and from 0.75% to 4.0% by weight of 2-(4-morpholinyldithio)benzothiazole, based on the weight of said rubber.

15. A sulfur-curable diene rubber composition containing as a non-scorch curing system capable of rapidly vulcanizing said rubber, from 0.5% to 1.5% by weight of sulfur, based on the weight of said rubber, and from 0.75% to 4.0% by weight of 2-(4-morpholinyldithio)-benzothiazole, based on the weight of said rubber, the total amount of free sulfur and secondary amino azole disulfide ranging from about 1.5% by weight to 4.5% by weight, based on the weight of the rubber.

16. A method of curing a sulfur-curable diene rubber composition comprising heating said rubber in the presence of a non-scorch curing system capable of rapidly vulcanizing said rubber composition comprised of from 0.5% to 1.5% by weight of sulfur, based on the weight of said rubber, and from 0.75% to 4.0% by weight of 2-(4-morpholinyldithio)benzothiazole, based on the weight of said rubber, the total amount of free sulfur and secondary amino azole disulfide ranging from about 1.5% by weight to 4.5% by weight, based on the weight of the rubber.

References Cited in the file of this patent

UNITED STATES PATENTS

| | | |
|---|---|---|
| 2,374,385 | Sauser | Apr. 24, 1945 |
| 2,835,670 | Hardman | May 20, 1958 |
| 2,871,239 | D'Amico | Jan. 27, 1959 |

OTHER REFERENCES

Wakeman, R. L.: The Chemistry of Commercial Plastics, New York, Reinhold, 1947, pp. 542–543, TP986-A2W3.